3,170,957
PROCESS FOR THE PRODUCTION OF ASYMMETRICAL DIALKYL HYDRAZINES

Heinz Jonas and Hans-Joachim Abendroth, Leverkusen, Germany, assignors to Farbenfabriken Bayer Aktiengesellschaft, Leverkusen, Germany, a corporation of Germany
No Drawing. Filed Jan. 31, 1961, Ser. No. 85,964
Claims priority, application Germany, Feb. 4, 1960,
F 30,467
6 Claims. (Cl. 260—583)

This invention relates to an improved process for the production of asymmetrical dialkyl hydrazines.

Asymmetrical dialkyl hydrazines are usually prepared by reduction of the corresponding N-nitrosodialkylamines.

The reduction of low molecular weight N-nitrosodialkylamines can be carried out with zinc and acetic acid.

It is also known to carry out the reduction of N-nitrosodialkylamines with a metal having an atomic weight of from 27 to 66 in an alkali medium or, when using an amalgamated metal, in a neutral aqueous medium.

Other reducing agents are lithium aluminium hydride in ether, sodium in alcohol and sodium in liquid ammonia in the presence of a substance which acts as an acid in liquid ammonia.

It is also known to carry out the reduction of N-nitrosodialkylamines with hydrogen in the presence of a catalyst, for example palladium, under high pressure in an aqueous or non-aqueous liquid medium.

The aforementioned processes necessitate the employment of valuable initial materials, such as zinc, acetic acid, catalysts or lithium aluminium hydride, or alternatively involve complicated processing steps, such as high pressure. The employment of other auxiliaries is also frequently necessary in order to recover the metals and also for the preparation of the free hydrazines in the case where the reduction is effected in an acid reaction medium. Furthermore only low yields are obtained when sodium is employed as the reducing agent.

According to the present invention there is provided a process for the production of asymmetrical dialkyl hydrazines by reduction of the corresponding N-nitrosodialkylamines with sodium amalgam in the presence of a hydrogen donor. The process according to the present invention gives high yields and does not require the employment of costly auxiliary substances or complicated processing steps. The process can therefore be carried out in a particularly simple manner which is advantageous from an economic point of view.

The present invention is particularly concerned with the preparation of N,N-dimethyl hydrazine. However, the process is also suitable for the production of higher asymmetrical dialkyl hydrazines, such as N,N-diethyl hydrazine, N,N-di-n-propyl hydrazine, N,N-diisopropyl hydrazine and N,N-di-n-butyl-hydrazine.

Suitable hydrogen donors for employment in the process according to the present invention are water, aqueous sodium hydroxide solution or an alcohol or alcoholic sodium alcoholate solution. These hydrogen donors simultaneously act as solvent for the nitrosamine reactant and for the hydrazine product. The nitrosamine is generally employed at a concentration of from 5% to 20% by weight, if the solubility of the particular nitrosamine employed does not require the use of a minor concentration of nitrosamine. It is preferable to combine an aqueous sodium hydroxide solution as reaction medium with an inert solvent, for example aniline, for the nitrosamine and the hydrazine product. The solvent must be immisible with the sodium hydroxide solution.

The reaction can be carried out at a temperature of from —20° C. to +100° C. The temperature should be as low as possible when water is employed as the reaction medium. The lower temperature limit is determined by the necessity to maintain an amalgam which is not too diluted in a liquid condition. Highest yields are obtained when the reaction is carried out at a temperature of from —20° C. to +40° C.

The sodium content of the amalgam should be as high as possible having regard to the particular temperature at which the reaction is carried out. A suitable amalgam is one containing 0.5% by weight of sodium such as is formed in alkali metal chloride electrolysis cells operating by the amalgam process. It is preferable to employ the amalgam in such an amount that its sodium content is reduced by only from 5 to 10% by reaction with the nitrosamine. In order to avoid secondary reactions, it is necessary to ensure that the amalgam is always present in an excess with respect to the nitrosamine. Thus, the amalgam must not be added to the nitrosamine but vice versa. It is not necessary to use special measures in order to produce a large amalgam surface; normal stirring is sufficient.

The yields obtained in the process according to the present invention are comparable to the highest yields obtained by the known processes, for example yields of up to 90% (based on the nitrosamine) are obtained in the production of N,N-dimethyl hydrazine by the process according to the present invention.

The amount of sodium employed in the process according to the present invention need only be from 5% to 50% above the stoichiometric amount. This is in contrast to the known processes which require an excess of metal of up to 300%. Moreover, the cost of one gram equivalent of sodium in the form of an electrolytically obtained sodium amalgam is substantially lower at the present time than the cost of one gram equivalent of a metal such as zinc or aluminium which are employed in the known processes. The superiority of the process according to the present invention is thus self-evident.

An additional advantage of the process according to the present invention is that the asymmetrical dialkyl hydrazines are obtained in a form which can easily be worked up. For example, when water is employed as reaction medium in the process according to the present invention the hydrazine is obtained in the form of an aqueous solution which also contains sodium hydroxide and quantities of amine and ammonia. The dialkyl hydrazine can be isolated from this solution by known processes, for example by distillation. The dialkyl hydrazine can be extracted from the aqueous solution containing sodium hydroxide with an inert solvent which is immiscible with water, for example with aniline. The dialkyl hydrazine can then easily be separated from the inert solvent of higher boiling point by distillation.

The working up process may be combined with the reduction process in such a way that the reduction of the nitrosamine and the extraction of the asymmetrical dialkyl hydrazine from the aqueous reaction medium take place simultaneously. To this end, the amalgam and a solution of the nitrosamine in an inert solvent which is immiscible with water, such as aniline, are placed in a stirrer-type vessel. Water is then run into the mixture which is kept stirred. The water takes up nitrosamine from the organic phase. Sodium hydroxide solution is formed in addition to the hydrazine by reaction with the amalgam. If the quantity of water is so adjusted that a sodium hydroxide solution of from 30 to 40% by weight is formed, the resulting solution gives off a major part of the hydrazine to the organic phase. The residue which remains is extracted with fresh solvent after separating the two phases. The thin solution thus formed is supplied to the reaction vessel. This method has two advantages:

(1) It permits the reaction temperature to be raised without lowering the yield. This can be important when the process according to the present invention is associated with an alkali metal chloride electrolysis.

(2) It is possible to operate with very little water thereby reducing the cost of extraction.

The process according to the present invention can be carried out either batch-wise or continuously. As already mentioned, the process according to the present invention can be associated with an alkali metal chloride electrolysis operating by the amalgam process. After leaving the cell, the fresh amalgam is cooled to the reaction temperature, it being preferable for the fresh amalgam to give up some of its heat content to the amalgam which has already been used for the reduction before the latter amalgam is returned to the cell, if necessary by way of a decomposer.

On the other hand, if it is desired to carry out the synthesis of asymmetrical dialkyl hydrazines independently of a concurrent product of chloride and alkali, the amalgam has to be prepared by electrolysis of the sodium hydroxide solution which is formed with the reduction of the nitrosamine in aqueous medium after the hydrazine has been separated out. By addition of the partial Equations 1 and 2, there is obtained the Equation 3 describing the total procedure, this showing particularly clearly the simple principle of the process according to the invention:

(1) 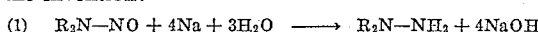
$$R_2N-NO + 4Na + 3H_2O \longrightarrow R_2N-NH_2 + 4NaOH$$

(2) 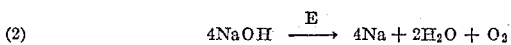
$$4NaOH \xrightarrow{E} 4Na + 2H_2O + O_2$$

(3) 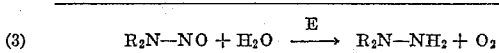
$$R_2N-NO + H_2O \xrightarrow{E} R_2N-NH_2 + O_2$$

The N-nitrosodialkylamines employed in the process according to the present invention can be prepared in known manner from the corresponding amines, sodium nitrate and a mineral acid. The nitrosamine is separated out of the reaction mixture by adding sodium hydroxide solution or potassium carbonate thereto. The nitrosamine thus separated can be supplied to the reduction process without further purification when operating in an aqueous medium.

*Example 1*

A solution of 7.4 g. of nitrosodimethylamine in 60 ml. of water is added dropwise to 2.25 kg. of amalgam containing 0.56% by weight of sodium in a vessel provided with a stirrer. The addition takes place over a period of about 30 minutes. The reaction temperature is kept at +20° C. by cooling the vessel. The mixture is stirred for 20 minutes after all the nitrosodimethylamine solution has been added. By this time the sodium content of the amalgam has fallen to 0.13% by weight. The aqueous caustic soda solution contains 4.28 g. of N,N-dimethyl-hydrazine in a concentration of about 6.0% by weight. The yield is 71.2%, based on the nitrosamine or 67.6% based on the sodium consumed.

*Example 2*

The procedure is as described in Example 1, with the exception that the reaction temperature is maintained at 0° C. The yield is 79.9%, based on the nitrosamine or 69.1%, based on the sodium consumed.

*Example 3*

18.5 kg. of amalgam are caused to flow through a vessel provided with a stirrer for 2 hours in such a way that a prescribed level is maintained. A solution of 7.4 g. of nitrosodimethylamine in 125 ml. of water is added dropwise to the amalgam over a period of 2 hours. The reaction temperature is 0° C. The fresh amalgam contains 0.52% by weight of sodium and the amalgam which discharges contains 0.44% by weight of sodium. When all the nitrosodimethylamine has been added the resulting aqueous solution contains 5.4 g. of N,N-dimethyl hydrazine. The yield is 90.0%, based on the nitrosamine introduced or 56.0%, based on the sodium consumed.

*Example 4*

A solution of 7.4 g. of nitrosodimethylamine in 125 ml. of absolute ethyl alcohol is added dropwise to 2.25 kg. of amalgam containing 0.45% by weight of sodium in a stirrer-type vessel. The addition takes place over a period of 1½ hours. During this time the reaction temperature is maintained at 50° C. The mixture is stirred for 20 minutes after all the nitrosodimethylamine solution has been added. By this time the amalgam concentration is 0.06% by weight. The alcoholic solution contains 2.88 g. of N,N-dimethyl hydrazine. The yield is 48.0%, based on the nitrosamine and also on the sodium consumed.

*Example 5*

3.0 kg. of amalgam containing 0.45% by weight of sodium and a solution of 7.4 g. of nitrosodimethylamine in 100 ml. of aniline are placed in a vessel provided with a stirrer, 24 ml. of water are then added dropwise over a period of 20 minutes and at +20° C. Stirring is thereafter continued for 1½ hours. By this time the sodium content of the amalgam has fallen to 0.12% by weight. After separating the phases there is obtained a total of 4.99 g. of N,N-dimethyl hydrazine, of which about 90% is in the aniline. The yield is 83.2%, based on the nitrosamine or 77.2%, based on the sodium consumed.

*Example 6*

A solution of 10.2 g. of nitrosodiethylamine in 125 ml. of water is added dropwise to 2.25 kg. of amalgam containing 0.68% by weight of sodium in a stirrer-type vessel. The addition is effected over a period of 1 hour and at 0° C. The mixture is stirred for 20 minutes after all the nitrosodiethylamine solution has been added. By this time the sodium content of the amalgam has fallen to 0.18% by weight. The resulting aqueous solution contains 6.42 g. of N,N-diethylhydrazine. The yield is 73.1%, based on the nitrosamine or 59.8%, based on the sodium consumed.

We claim:

1. Process for the production of asymmetrical di-lower-alkyl hydrazines which comprises reducing an N-nitroso-di-lower-alkylamine with sodium amalgam containing about 0.4–0.7% by weight of sodium in the presence of a hydrogen donor selected from the group consisting of water, aqueous caustic, lower alkanols, and alcoholic sodium alcoholates as reducing agents under reaction conditions including adding the n-nitroso-di-lower alkylamine to the sodium amalgam, a temperature of between −20° C. and +100° C. and an excess of sodium amounting to 5–50% above the stoichiometric amount required for the reduction of the nitrosamine and recovering the asymmetrical di-lower alkyl hydrazine thereby formed.

2. Process according to claim 1 in which said reduction is effected at a temperature between about −20 and +40° C.

3. Process according to claim 1 in which said sodium amalgam contains about 0.5% by weight of sodium.

4. Process according to claim 1 in which said group member is water and wherein said reduction is effected in the additional presence of aniline.

5. Process according to claim 1 in which said N-nitrosodialkylamine is N-nitrosodimethylamine.

6. Process according to claim 1 in which said N-nitrosodialkylamine is N-nitrosodiethylamine.

References Cited in the file of this patent
UNITED STATES PATENTS

| | | |
|---|---|---|
| 356,640 | Hickly | Jan. 25, 1887 |
| 2,802,031 | Horvitz | Aug. 6, 1957 |
| 2,961,467 | Derr | Nov. 22, 1960 |

OTHER REFERENCES

Remy: "Treatise on Inorganic Chemistry," vol. 1, p. 41, 1956.